Sept. 12, 1939.  L. DURANTON  2,172,700
ANTISKIDDING APPLIANCE FOR VEHICLES
Filed April 4, 1938  2 Sheets-Sheet 1
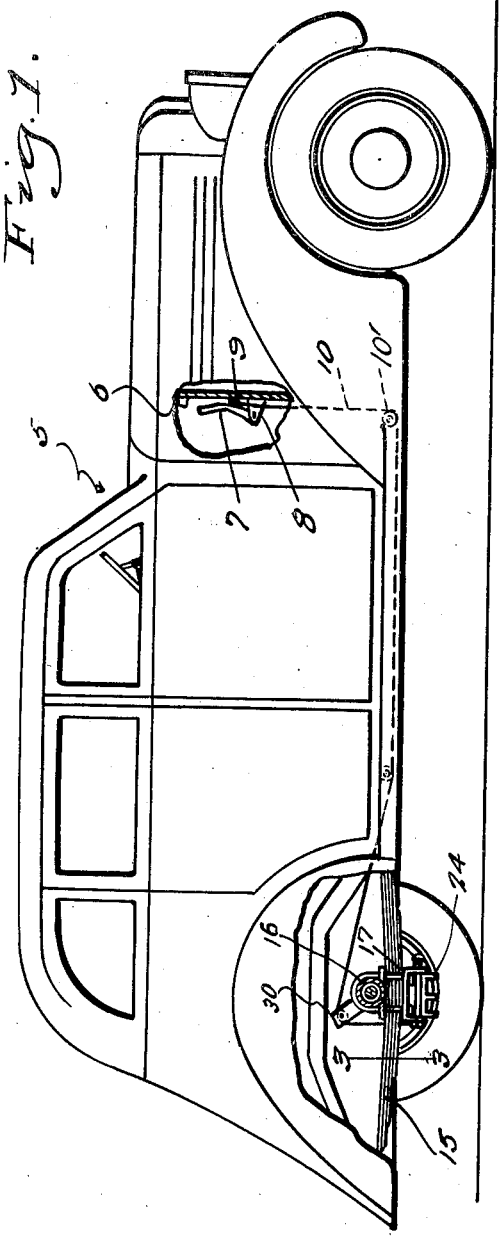
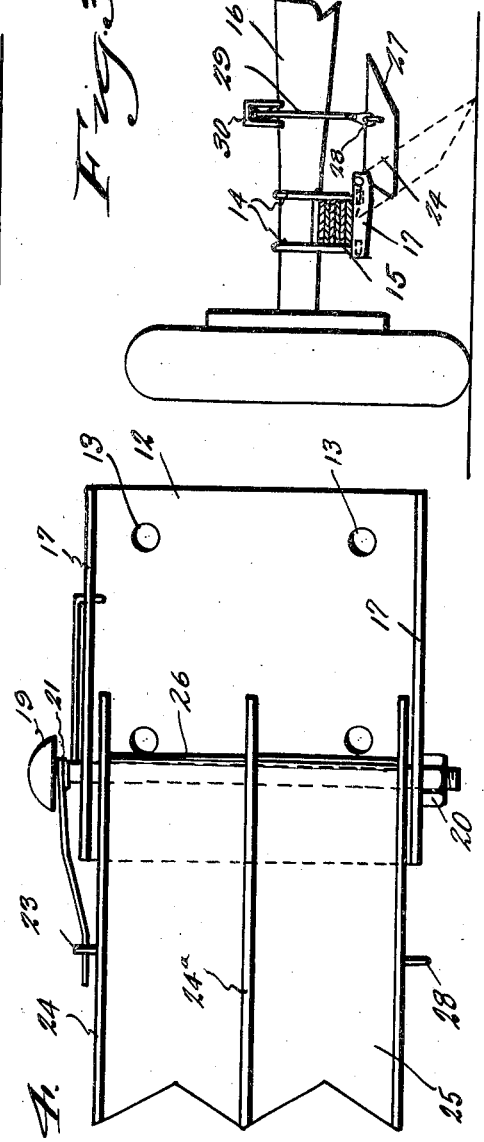
Inventor
Leon Duranton
By Clarence A. O'Brien
Hyman Berman
Attorneys Sept. 12, 1939.　　　　　L. DURANTON　　　　　2,172,700
ANTISKIDDING APPLIANCE FOR VEHICLES
Filed April 4, 1938　　　　2 Sheets-Sheet 2
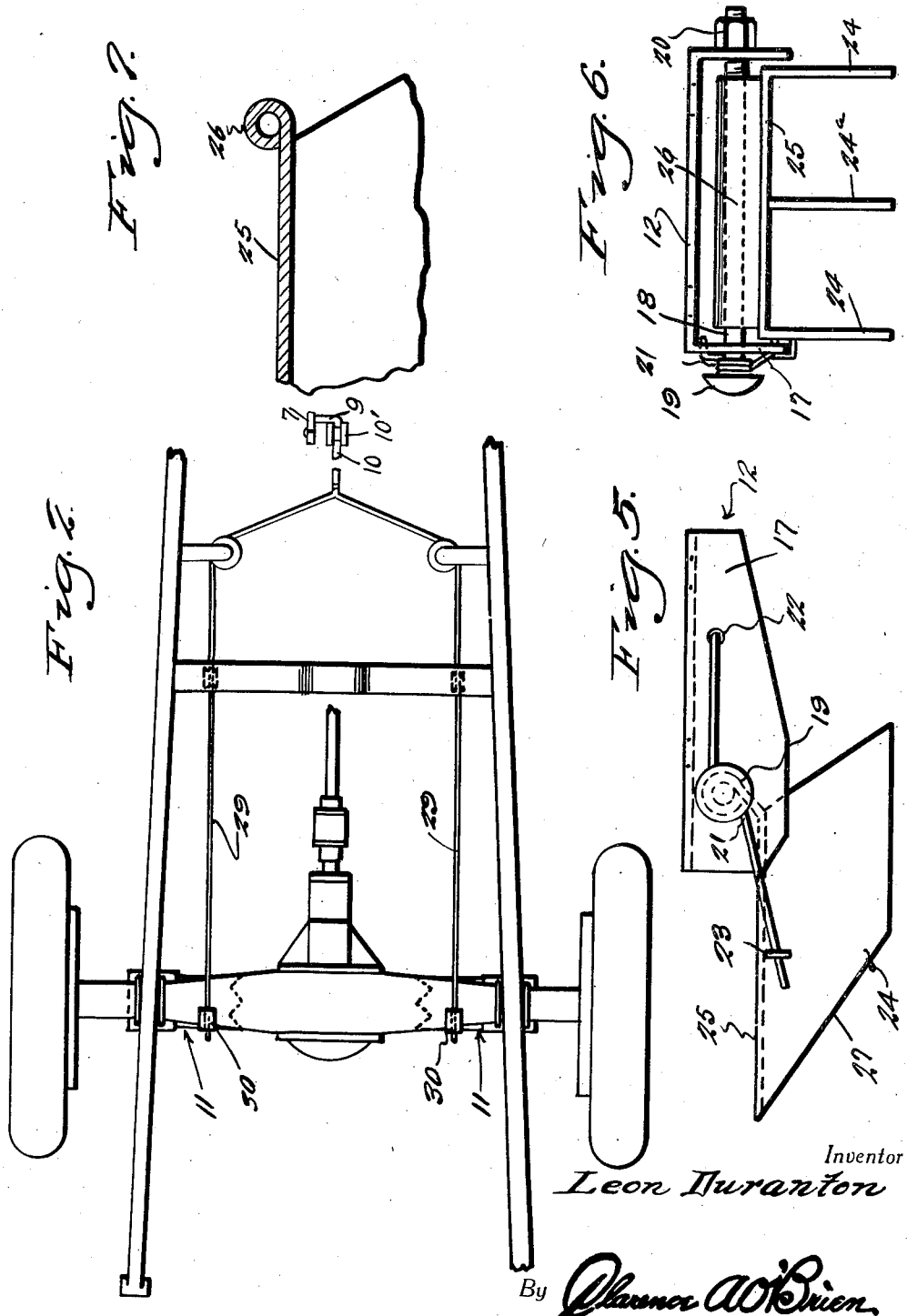
Inventor
Leon Duranton
By Clarence A. O'Brien
Hyman Berman
Attorneys Patented Sept. 12, 1939

2,172,700

UNITED STATES PATENT OFFICE 2,172,700

ANTISKIDDING APPLIANCE FOR VEHICLES

Léon Duranton, Arkville, N. Y.

Application April 4, 1938, Serial No. 200,027

1 Claim. (Cl. 188—5)

This invention appertains to new and useful improvements in means for preventing uncontrollable skidding of automobiles and like vehicles.

The principal object of the present invention is to provide an anti-skid appliance for vehicles which will be positive acting and will not permit a vehicle to skid laterally when out of control.

Another important object of the invention is to provide an anti-skid appliance for automobiles which will be available for instant use.

These and various other important objects and advantages of the invention will become apparent to the reader of the following specification.

In the drawings:

Figure 1 represents a side elevational view of an automobile with the parts broken away to disclose the present invention.

Figure 2 is a fragmentary top plan view of an automobile chassis showing the appliance installed.

Figure 3 is a fragmentary sectional view on the line 3—3 of Figure 1.

Figure 4 is a bottom plan view of one of the anti-skid units.

Figure 5 is a side elevational view of one of the units.

Figure 6 is an end elevational view of one of the units.

Figure 7 is a fragmentary sectional view through one of the ground engaging elements of a unit.

Referring to the drawings wherein like numerals designate like parts, it can be seen that numeral 5 generally refers to a conventional automobile having the dash board 6 on which is mounted a rockable hand lever 7, the lever being supported by the outstanding ears 8 and being provided with a curved intermediate portion to the forward side of which projects an eye 9 from which the cable 10 extends. A pull downwardly on the lever as shown in Figure 1 by the cable 10 maintains the lever 7 in upright position, but when the lever is pulled rearwardly the cable 10 is released and the anti-skidding units 11—11 are released.

Each of these units consists of a plate 12 having two pair of openings 13 therein for receiving the legs of the usual U-clamps 14 which hold the leaf springs 15 properly secured to the rear axle housing 16.

The plate 12 is provided with the end flanges 17—17 extending downwardly and through these flanges are disposed the bolt 18 having the head 19 at one end and being threaded at its opposite end to accommodate the nut 20.

A spring 21 is coiled around one end portion of the bolt between the head 19 and the adjacent flange 17 and has one end disposed through an opening 22 in said flange 17 and its other end disposed through the apertured lug 23 on one side flange 24 of the ground engaging element 25. The ground engaging element 25 is provided with a rolled end portion defining a barrel 26 through which the bolt 18 passes.

It will be observed, that the ground engaging end of the plate 25 and the adjacent ends of the flanges 24 are cut off on a bias as denoted by numeral 27.

Obviously the spring 21 serves to throw the ground engaging element downwardly in a quick manner upon releasement of the cable 10, the remaining flanges 24 being provided with apertured ears 28 to which the cables 29 connect and these cables in turn connect to the aforementioned cable 10.

The cables 29 are disposed over pulleys 30 supported on the rear axle housing 16.

As will be seen from Figure 2 the cable 10 is provided with a pair of diverging parts which are connected with the cables 29 and the single part of the cable 10 passes around a pulley 10' and then upwardly to the eye 9 on the lever 7. With the lever 7 in the position shown in Figure 1 the cable 10 is held taut and thus causes the cable 29 to hold the ground engaging elements in raised position but when the lever 7 is swung downwardly the cable 10 is slackened so that the springs of the ground engaging elements can swing said elements downwardly as, of course, the cables 29 will also be in slackened condition.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

An anti-skid appliance for a vehicle comprising a pair of spaced channel-shaped plates connected with the rear axle of the vehicle, said plates extending longitudinally of the axle and having flanges extending downwardly, an inverted channel-shaped member having one end pivoted to the inner end of each plate with its other end beveled upwardly and outwardly from the lower edges of its flanges to its web portion, a spring connected with each pivot and having one end connected with the channel plate and its other end with the channel member, said spring acting to hold the channel member in lowered position with its beveled end engaging the road surface and manually operated means for normally holding the channel members in raised position.

LÉON DURANTON.